United States Patent
Draelos et al.

(10) Patent No.: US 10,837,811 B1
(45) Date of Patent: Nov. 17, 2020

(54) SYSTEMS, METHODS AND COMPUTER PROGRAM PRODUCTS FOR SELF-TUNING SENSOR DATA PROCESSING

(71) Applicant: National Technology & Engineering Solutions of Sandia, LLC, Albuquerque, NM (US)

(72) Inventors: Timothy J. Draelos, Albuquerque, NM (US); Aleksandra Faust, Palo Alto, CA (US); Hunter A. Knox, Albuquerque, NM (US); Matthew G. Peterson, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 333 days.

(21) Appl. No.: 15/828,188

(22) Filed: Nov. 30, 2017

Related U.S. Application Data

(60) Provisional application No. 62/428,346, filed on Nov. 30, 2016.

(51) Int. Cl.
  *G01D 18/00* (2006.01)
  *G06N 5/04* (2006.01)
  *G06N 20/00* (2019.01)

(52) U.S. Cl.
  CPC .......... *G01D 18/006* (2013.01); *G06N 5/046* (2013.01); *G06N 20/00* (2019.01)

(58) Field of Classification Search
  CPC ....... G01D 18/006; G06N 20/00; G06N 5/046
  See application file for complete search history.

(56) References Cited

U.S. PATENT DOCUMENTS

| | | | |
|---|---|---|---|
| 2004/0015336 A1* | 1/2004 | Kulesz | G08B 21/12 703/11 |
| 2010/0297608 A1* | 11/2010 | Stern | B82Y 10/00 435/5 |

OTHER PUBLICATIONS

Akaike, H., "Markovian Representation of Stochastic Processes and Its Application to the Analysis of Autoregressive Moving Average Process," Ann. Inst. Stat. Math. (1974) 26:363-387.
Akansu, A. N. et al., "Emerging applications of wavelets: A review," Physical Communication (2010) 3:1-18.

(Continued)

*Primary Examiner* — Mischita L Henson
(74) *Attorney, Agent, or Firm* — Daniel J. Jenkins

(57) ABSTRACT

Systems and methods are disclosed that include tools that utilize Dynamic Detector Tuning (DDT) software that identifies near-optimal parameter settings for each sensor using a neuro-dynamic programming (reinforcement learning) paradigm. DDT adapts parameter values to the current state of the environment by leveraging cooperation within a neighborhood of sensors. The key metric that guides the dynamic tuning is consistency of each sensor with its nearest neighbors: parameters are automatically adjusted on a per station basis to be more or less sensitive to produce consistent agreement of detections in its neighborhood. The DDT algorithm adapts in near real-time to changing conditions in an attempt to automatically self-tune a signal detector to identify (detect) only signals from events of interest. The disclosed systems and methods reduce the number of missed legitimate detections and the number of false detections, resulting in improved event detection.

18 Claims, 11 Drawing Sheets

(56) References Cited

OTHER PUBLICATIONS

Allen, R. V., "Automatic Earthquake Recognition and Timing from Single Traces," Bulletin of the Seismological Society of America (1978) 68(5):1521-1532.

Anant, K. S. et al., "Wavelet Transform Methods for Phase Identification in Three-Component Seismograms," Bulletin of Seismological Society of America (1997) 87(6):1598-1612.

Baer, M. et al.,"An Automatic Phase Picker for Local and Teleseismic Events," Bulletin of the Seismological Society of America (1987) 77(4):1437-1445.

Baillard, C. et al., "An Automatic Kurtosis-Based P- and S-Phase Picker Designed for Local Seismic Networks," Bulletin of the Seismological Society of America (2014) 104:394-409.

Bogiatzis, P. et al., "Continuous Wavelet Decomposition Algorithms for Automatic Detection of Compressional- and Shear-Wave Arrival Times," Bulletin of the Seismological Society of America (2015) 105(3):1628-1641.

Chen, C. et al., "PhasePApy: A Robust Pure Python Package for Automatic Identification of Seismic Phases," Seismological Research Letters (2016) 87(6):1384-1396.

Dai, H. et al., "Automatic picking of seismic arrivals in local earthquake data using an artificial neural network," Geophys. J. Int. (1995) 120:758-774.

Gentili, S. et al., "Automatic picking of P and S phases using a neural tree," Journal of Seismology (2006) 10:39-63.

Hibert, C. et al., "Automated identification, location, and volume estimation of rockfalls at Piton de la Fournaise volcano," J. Geophys. Res. Earth Surf. (2014) 119:1082-1105.

Kitagawa, G. et al., "A Procedure for the Modeling of Non-Stationary Time Series," Ann. Inst. Statist. Math. (1978) 30:351-363.

Knox, H. A., "Eruptive Characteristics and Glacial Earthquake Investigation on Erebus Volcano, Antarctica," Dissertation, New Mexico Institute of Mining and Technology, Socorro, New Mexico, May 2012, 76 pages.

Lay, T. et al., Modem Global Seismology, Academic Press, San Diego, California, 1995, 522 pages.

Leonard, M. et al., "Multi-component autoregressive techniques for the analysis of seismograms," Physics of the Earth and Planetary Interiors (1999) 113:247-263.

Lomax, A. et al., "Automatic Picker Developments and Optimization: FilterPicker-a Robust, Broadband Picker for Real-Time Seismic Monitoring and Earthquake Early Warning," Seismological Research Letters (2012) 83(3):531-540.

Panagiotakis, C. et al., "Automatic P-Phase Picking Based on Local-Maxima Distribution," IEEE Transactions on Geoscience and Remote Sensing (2008) 46(8):2280-2287.

Riggelsen, C. et al., "A Machine Learning Approach for Improving the Detection Capabilities at 3C Seismic Stations," Pure Appl. Geophys. (2014) 171:395-411.

Saragiotis, C. D. et al., "PAI-S/K: A Robust Automatic Seismic P Phase Arrival Identification Scheme," IEEE Transactions on Geoscience and Remote Sensing (2002) 40(6):1395-1404.

Sleeman, R. et al., "Robust automatic P-phase picking: an on-line implementation in the analysis of broadband seismogram recordings," Physics of the Earth and Planetary Interiors (1999) 113:265-275.

Vassallo, M. et al., "Automatic Picker Developments and Optimization: A Strategy for Improving the Performances of Automatic Phase Pickers," Seismological Research Letters (2012) 83(3):541-554.

Wang, J. et al., "Identification and Picking of S Phase Using an Artificial Neural Network," Bulletin of the Seismological Society of America (1997) 87(5):1140-1149.

Withers, M. et al., "A Comparison of Select Trigger Algorithms for Automated Global Seismic Phase and Event Detection," Bulletin of the Seismological Society of America (1998) 88(1):95-106.

Zhang, H. et al., "Automatic P-Wave Arrival Detection and Picking with Multiscale Wavelet Analysis for Single-Component Recordings," Bulletin of the Seismological Society of America (2003) 93(5):1904-1912.

\* cited by examiner

SYSTEMS, METHODS AND COMPUTER PROGRAM PRODUCTS FOR SELF-TUNING SENSOR DATA PROCESSING

CROSS-REFERENCE TO RELATED APPLICATIONS

This application claims benefit of U.S. Provisional Patent Application No. 62/428,346. entitled "SELF-TUNING SENSOR DATA PROCESSING SYSTEMS AND METHODS", filed Nov. 30, 2016, which is incorporated by reference herein in its entirety.

STATEMENT OF GOVERNMENT INTEREST

The United States Government has rights in this invention pursuant to Contract No. DE-AC04-94AL85000 between the United States Department of Energy and Sandia Corporation, and Contract No. DE-NA0003525 between the United State Department of Energy and National Technology & Engineering Solutions of Sandia, LLC, both for the operation of the Sandia National Laboratories.

FIELD

The present disclosure is generally directed to detection systems, methods and computer program products, and is more particularly directed to systems, methods and computer program products that include sensor detection processing architectures that adjusts effective trigger levels to reduce false alarm rates and missed detections.

BACKGROUND

Data from sensor networks are processed to detect a variety of events from a variety of corresponding sensor systems, such as, but not limited to seismic, motion or light disturbance, audible and non-audible noise, groundwater quality, air quality and weather/environmental monitoring sensor systems. For example, data from seismic sensor networks may be processed to detect a variety of sources such as underground explosions, volcanic eruptions, induced micro-fractures, road usage, footsteps, etc. The quality of automatic detection depends on a large number of data processing parameters that interact in complex ways. Researchers routinely perform studies to determine the optimal parameters to detect a triggering event. This largely manual process is painstaking and does not guarantee that the resulting controls are the optimal configuration settings. Yet, achieving superior automatic detection of events is closely related to these parameters.

A need remains for systems and methods that reduce the number of missed legitimate events and the number of false event sensor detections, thereby achieving better performance than is currently possible by manual tuning, and with much less time and effort devoted to the tuning process.

SUMMARY OF THE DISCLOSURE

The present disclosure is directed to systems, methods and computer program products that include sensor detection processing architectures that adjusts effective trigger levels to reduce false alarm rates and missed detections.

According to an embodiment of the disclosure, a detection system is disclosed that includes three or more sensors that each generate sensor data, a processing unit for receiving the sensor data, and a processor configured to test the sensor data against all event-settings and automatically self-tune the signal detector for each sensor of the three or more sensors.

According to another embodiment of the disclosure, a detection method is disclosed that includes receiving a signal from three or more sensors, determining if each signal exceeds a threshold detection level indicating an event, and comparing a sensor signal initiating a detection within a specified time window to signal detections of neighboring sensors within a same time window and if the sensor signal is in the minority of detection decisions by either detecting a signal when most of its neighbors did not or by not detecting a signal when most of its neighbors did, then adjusting the sensor trigger level.

According to an embodiment of the disclosure, a computer program product is disclosed that includes a non-transitory computer recordable storage medium storing computer code which, when executed by a processor, performs a computer-implemented method of determining a threshold detection level for an event of a signal. The method including receiving a signal from three or more sensors, determining if each signal exceeds a threshold detection level indicating an event, and comparing a sensor signal initiating a detection within a specified time window to signal detections of neighboring sensors within a same time window and if the sensor signal is in the minority of detection decisions by either detecting a signal when most of its neighbors did not or by not detecting a signal when most of its neighbors did, then adjusting the sensor trigger level.

An advantage of the disclosed systems, methods and computer program products are lowered mobilization cost and improved detection capabilities of sensor systems, including, but not limited to, seismic sensor systems.

Another advantage of the disclosed systems, methods and computer program products are lowered false alarm rates and missed detections for sensor detection systems.

Another advantage of the disclosed systems, methods and computer program products is sensor detection processing architectures that can be included into existing sensor detection systems to improve detection capabilities of sensor systems.

Other advantages include 1) the simplicity of the algorithm, 2) the ease of placing this algorithm into an existing processing (e.g., seismic) pipeline, and 3) the fact that initial detection parameters are unimportant (they will get adjusted).

Other features and advantages of the present disclosure will be apparent from the following more detailed description of the preferred embodiment, taken in conjunction with the accompanying drawings, which illustrate, by way of example, the principles of the disclosure.

BRIEF DESCRIPTION OF THE DRAWINGS

Wherever possible, the same reference numbers will be used throughout the drawings to represent the same parts.

DETAILED DESCRIPTION

Figure 1:
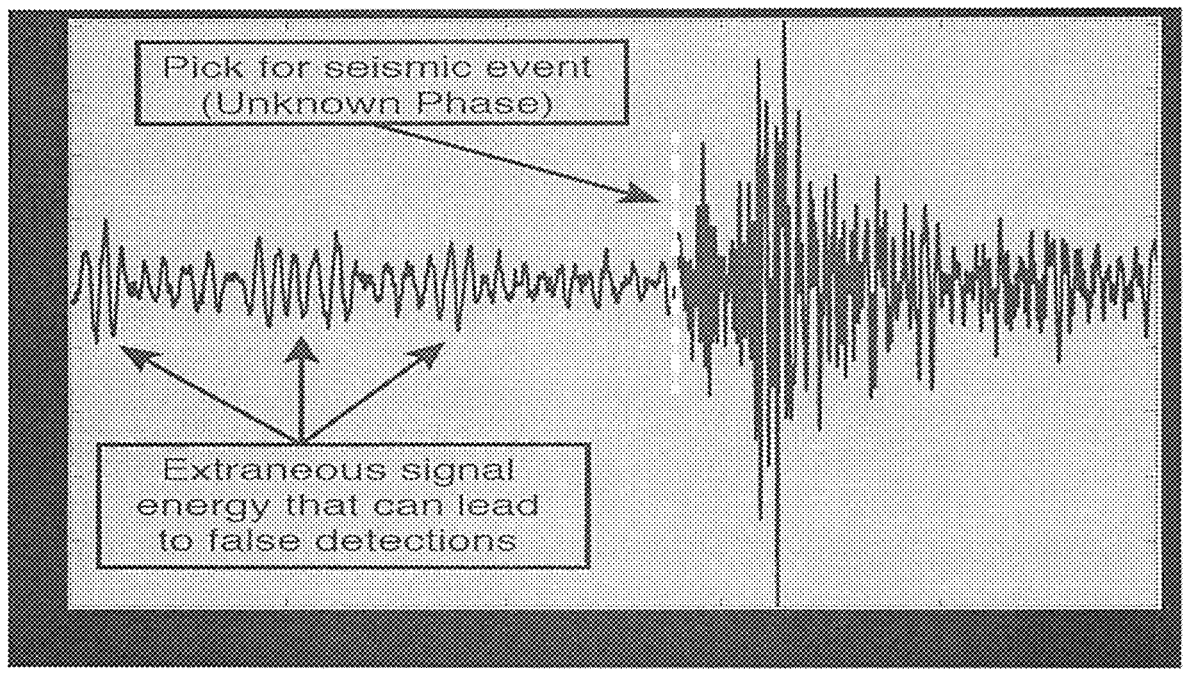
FIG. 1 is a seismogram with energy clearly arising from a seismic event (e.g., Earthquake, explosion, volcanic eruption, etc.) as well as other pre-event transient energy.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete and will fully convey the scope of the invention to those skilled in the art.

The present disclosure is directed to systems, methods and computer program products for automated sensor parameter tuning. The systems include Dynamic Detector Tuning (DDT) architecture and software, which may be referred to as Automated Sensor Tuning (AST) architecture and software, that learns near-optimal parameter settings for events of interest from the herein disclosed processing systems. As used herein, an "event" means an important activity for which the sensors are designed to detect. DDT learns to test the raw sensor signal against all event-settings and automatically self-tune to an emerging event in real-time. The disclosed systems reduce both the number of missed legitimate signal detections indicating an event and the number of false signal detections indicating an event, thereby leading to improved event detection.

The sensors are part of a sensor network in a detection system. The detection system may be, but is not limited to, a seismic, a motion or light disturbance, audible and non-audible noise, a groundwater quality, air quality and weather/environmental monitoring sensor systems. In an embodiment, the sensors may be, but are not limited to seismic, motion, environmental, surveillance (including cameras), and sound or noise. In an embodiment, a seismic detection system may be used for detecting both underground (site, explosions, hydro fracture, mining, earthquakes, tunneling) and surface (traffic, footsteps, denial of sight) events on global, regional, and local scales.

The quality of automatic signal detections from sensor networks depends on individual detector trigger levels (TLs) for each sensor. The largely manual process of identifying effective TLs is painstaking and does not guarantee optimal configuration settings, yet achieving superior automatic detection of signals and, ultimately, events is closely related to these parameters. DDT systems automatically adjust effective TL settings for signal detectors to the current state of the environment by leveraging cooperation within a neighborhood of network sensors. After a stabilization period, the DDT algorithm can adapt in near real-time to changing conditions and automatically tune a signal detector to identify (detect) signals from only events of interest.

The disclosed systems reduce the number of missed legitimate signals indicating an event and the number of false signal indicating event detections. Reducing false alarms early in the pipeline processing has a significant impact on the goal of improved event detection. In an embodiment, the pipeline processing may be seismic pipeline processing. The systems provide an important new tool to automatically tune complex remote sensing systems for existing sensor performance boosting and new sensor deployment. Systems tuned in this way achieve better performance than is currently possible by manual tuning, and with much less time and effort devoted to the tuning process, providing improvements in detection (increased true positives and true negatives detection rates and decreased false positive and false negative detection rates). With ground truth on detections from a seismic sensor network monitoring the Mount Erebus Volcano in Antarctica. it was shown that DDT reduced the number of false signal detections by 18% and the number of missed signal detections by 11% when compared to optimal fixed trigger levels for all sensors. The combination of combining 1) agreement of neighboring sensor for valid detections and 2) automated, continuous, adaptive tuning of detection parameters provides a unique approach to sensor validation and tuning.

The DDT algorithm automatically identifies effective trigger level (TL) settings for each sensor, adapting values to the current state of the environment by leveraging cooperation within a neighborhood of sensors in a larger network. Each sensor in a network must have its own neighborhood, established as a set of other sensors having an overlapping detection footprint. For example, a subgroup of sensors within a network that are located in close geographic proximity will tend to detect signals from the same events at nearly the same time, regardless of the location of the events, when other sensors in the same network located further from the sensor will not. Note that each sensor in a network can, and probably will, be a part of multiple neighborhoods, but it only has one neighborhood to aid in tuning its TL.

The key metric that guides the dynamic tuning is consistency of each sensor with its nearest neighbors: parameters are automatically adjusted on a per station basis to be more or less sensitive to produce consistent agreement of detections in its neighborhood. The DDT algorithm adapts in near real-time to changing conditions in an attempt to automatically self-tune a signal detector to identify (detect) only signals from events of interest (e.g., those that can be located, and hence require multiple 45 detecting sensors). The overall goal is to reduce the number of missed legitimate event detections and the number of false event detections simultaneously. The computational cost of DDT was negligible in experiments, yet controlling the number and reliability of signal detections is important because these characteristics directly impact all subsequent steps in a data processing pipeline: signal association, event location, event magnitude estimation, etc. Hence the quality of the event catalog, and hence the amount of analyst review necessary, is directly dependent on the quality of signal detections.

DDTs design includes plug and play parameter controllers that can be exchanged as needed. In an embodiment, a proportional controller may be used to change Short Term Average/Long Term Average (STA/LTA) trigger level parameter values aiming at having consistent detections across the stations in a network neighborhood. In other embodiments, other controllers may be used to change pipeline parameters to make improvements in detections.

There are many signal detection and phase picking algorithms for seismic waveforms, all of which have adjustable parameters that could, potentially, leverage DDT. Energy transient methods compare the short-term average (STA—assumed to be dominated by an arriving signal) and long-term average (assumed to be background noise or coda) of the waveform or a characteristic function derived from the waveform and identify a signal detection when the comparison (e.g., STA/LTA ratio) exceeds a threshold (Allen, 1978; Baer and Kradolfer, 1987; Withers et al., 1998; Lomax et al., 2012: Vassallo et al., 2012). The Frequency-Band phase picker (FBPicker) measures the transient energy of a characteristic function in multiple 60 frequency bands to identify signal detections that have energy greater than a dynamic threshold (Chen and Holland, 2016).

Higher-order statistics methods (Saragiotis et al., 2002; Panagiotakis et al., 2008: Baillard et al., 2014: Hibert et al., 2014) use measured statistics, such as skewness and kurtosis functions, to identify arriving phases when the statistic of interest exceeds a threshold. Even with machine learning and artificial neural network methods (Dai and MacBeth, 1995; Wang and Teng, 1997: Gentili and Michelini, 2006: Riggelsen and Ohrnberger, 2014). a threshold associated with the confidence of the output (e.g., signal vs. noise) can be adjusted to vary the detection sensitivity of a trained detection model. Other phase-picking techniques, such as wavelet transform methods (Anant and Dowla. 1997: Akansu et al., 2010; Bogiatzis and Ishii, 2015) and autoregressive Akaike Information Criteria (AIC) (Akaike, 1974) methods (Kitagawa and Akaike. 1978; Leonard and Kennett, 1999: Sleeman and van Eck, 1999; Zhang et al., 2003; Gentili and Michelini. 2006; Baillard et al., 2014; Bogiatzis and Ishii, 2015) rely on initial signal detection and then identify the type of phase arrival and/or more precisely determine the arrival time. All of the signal detection methods mentioned here utilize a threshold, which can be dynamically tuned to vary detection sensitivity.

A simple and commonly-used signal detection method applies the STA/LTA algorithm on filtered time-series data and has a number of adjustable parameters, including a detection Trigger Level (TL). A detection occurs when the ratio of the STA signal energy within a pre-specified time window to the LTA energy within an earlier pre-specified time window exceeds the TL. Ideally, a seismogram that includes a high Signal-to-Noise Ratio (SNR) seismic event should illicit a detection, while extraneous signal energy should not (see FIG. 1).

DDT can be applied to the STA/LTA signal detector to demonstrate the benefit of adaptively tuning the detector TL parameter, but the invention is applicable to any detection algorithm with a detection threshold for a set of sensors that have coverage of the same part of the world (e.g., a seismic sensor network with multiple sensors that are in a position to detect explosions from the same mine). In an embodiment, the set of sensors or sensor network may include three or more sensors. In another embodiment, the number of sensors may be five or more sensors. In another embodiment, the set of sensors may include ten or more sensors. In another embodiment, the set of sensors may include twenty or more sensors. In an embodiment, the number of sensors may be between three and ten sensors. In an embodiment, the set of sensors is a plurality of sensors.

DDT is, therefore, applicable to infrasound sensor networks as well as groundwater quality, air quality, and weather/environmental monitoring where a signal detection indicating an event occurs when a measurement exceeds or falls below a threshold. The STA/LTA TL and other parameters are often established when sensors are deployed and never change or change when a certain data analysis is conducted. This process, at least in part, can lead to many false and missed detections over a network of sensors. For example, only 8% of 5,575,923 International Monitoring System (IMS) seismic detections were included in the International Data Center (IDC) analyst-reviewed bulletin for 2014. A large portion, but not all, of the remaining detections are likely false positives, leading to more data storage and processing. Moreover 39% of IDC bulletin detections are found or modified by human analysts, indicating a large percentage of false negatives (missed detections) and wrongly measured detections by the automated detector, which take analyst time and effort to amend. The STA/LTA parameters, fixed over time, are largely responsible for the high number of false detections evident in the International Monitoring System (IMS).

Dynamic Detector Tuning

DDT assumes that each sensor in a seismic network will operate best with its own custom detection parameters. The seismogram, u(t), recorded at a given sensor can be expressed as a seismic source signal, s(t), convolved with a propagation filter, g(t), which includes site and environment noise, and a seismometer filter, i(t), where t is time (Equation 10.3 in Lay and Wallace, 1995).

$$u(t)=s(t)*g(t)*i(t) \qquad (1)$$

The terms g(t) and i(t) are specific to each sensor in addition to changing over time. Adapting the trigger level for each sensor to these temporal dynamics and the amplitude dynamics relative to neighboring sensors motivates the objective of adaptive, real-time tuning. Determining what the TL values should be for a given sensor is a difficult problem to solve, increasingly so as network sizes grow. DDT leverages the fact that detection and location of events requires evidence from multiple sensors. It draws conclusions about TL settings from the consensus of sensor detection responses or lack thereof in neighborhoods of sensors within a network.

Figure 2:
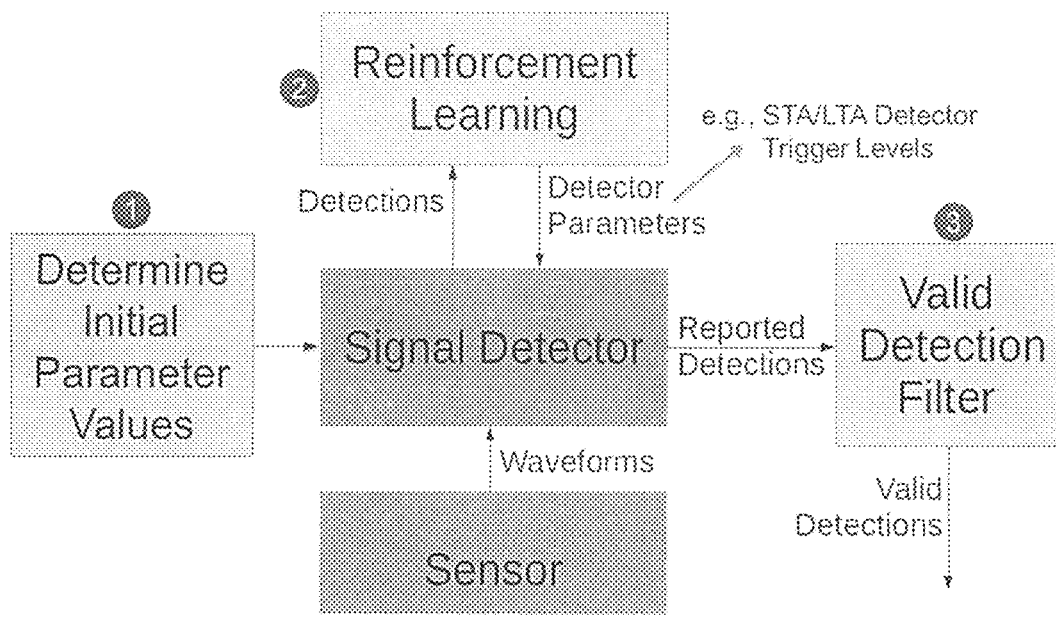
FIG. 2 is a block diagram of the Dynamic Detector Tuning method.

In an embodiment, the DDT main controller includes a reinforcement learning (RL) paradigm or element (see FIG. 2), whereby the state of the environment is observed and acted upon by adjusting detector parameters. RL takes detections produced by the signal detector for each sensor and determines new parameter values. In an embodiment, the process uses a Majority Rules RL procedure, which adapts detector parameters for each sensor on-the-fly, to the current signal environment exhibited by the input detections.

For example, experiments show that adjusting the TL of the STA/LTA signal detector for each sensor results in improved detection performance.

The present disclosure also discloses a Majority Rules Algorithm (MRA) as a particular method of DDT. It relies on the consensus of sensors within a neighborhood of a larger network regarding detections or non-detections during a specified period of time. The MRA looks for signal detections within a small-time window while sliding across all waveforms. At each time step, the sensors in each neighborhood are split into two groups.

Those detecting a signal
Those not detecting a signal

Figure 3:
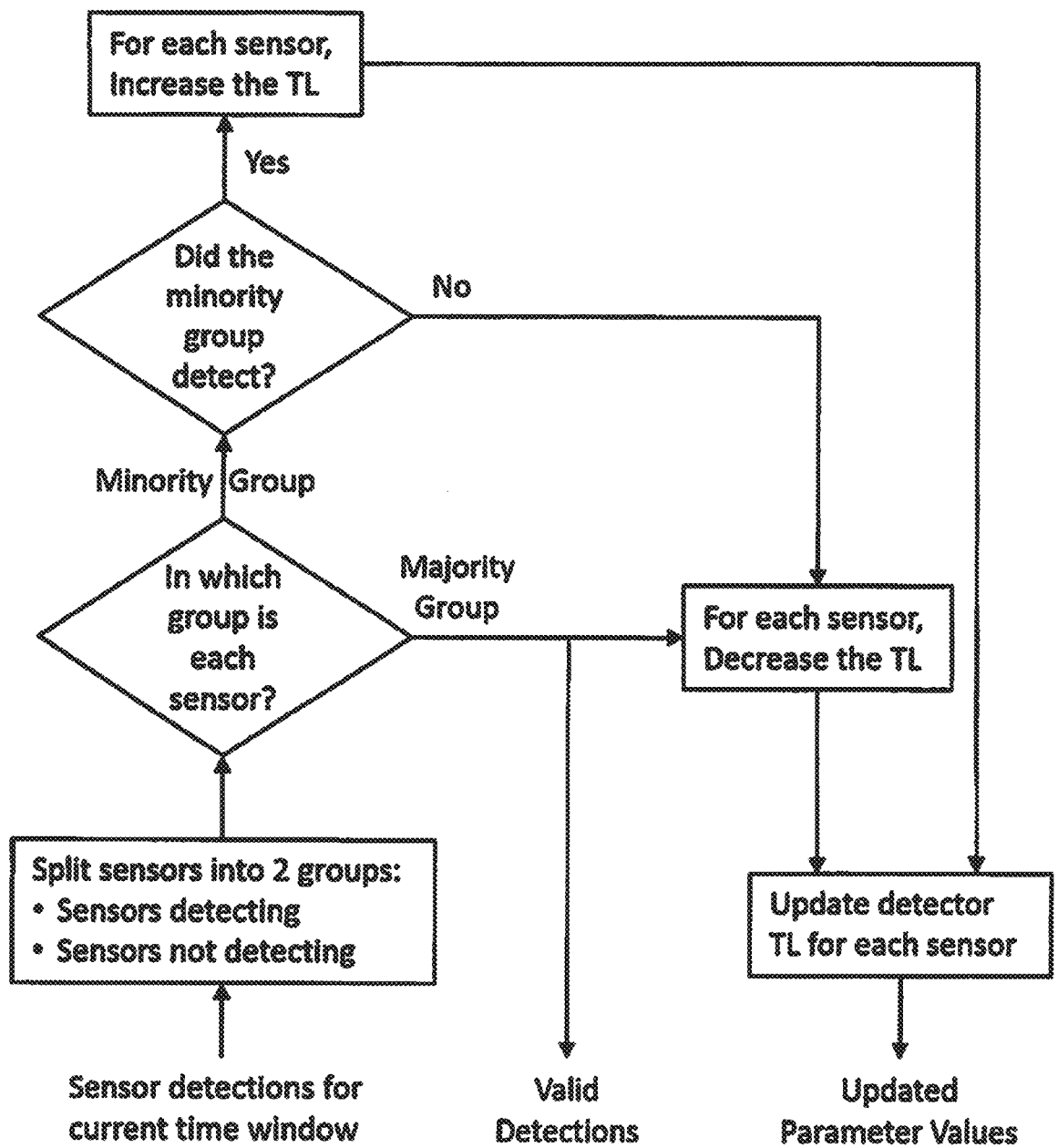
FIG. 3 is a flowchart of the Majority Rules Algorithm.

Sensors in the majority group decrease their TLs, while sensors in the minority group decrease their TLs if they did not detect and increase their TLs if they did (see the MRA flowchart in FIG. 3). The goal of the MRA is to drive TLs down at a certain decay rate until the algorithm finds and hovers just above the noise floor of each sensor, setting each sensor's TL accordingly. The rationale is that as TLs are driven down, eventually one of the following occur:

1) A minority of sensors each detect a signal, indicating false detections relative to the rest of the neighborhood. These sensors' TLs are increased to avoid false detections in the next time window. Note that the detection of minority sensors can be ignored or labelled differently as potentially false.
2) If the majority of sensors detect, their TLs are lowered because they might be able to detect a similar but smaller event with a lower TL.
3) Even if the majority of sensors do not detect, their TLs are lowered to be more sensitive.

Our first attempts at the MRA did not include a TL decay rate, but without it, TLs can rise indefinitely. This phenomenon occurred because the only requirement was for the stations to reach agreement, and if all the TLs were so high that they never detected then they were in constant agreement. The decay rate pushes TLs down in order to make the sensors more sensitive to detections until noisy, extraneous signals are detected without agreement within the neighborhood.

Another revelation during early experiments with the algorithm was the step size for correcting TLs. The algorithm initially took forced steps large enough to correct detection mistakes by minority sensors. This caused an issue with over correcting and would cause a large increase in missed and false detections when an anomalously large or very weak signaled occurred. To counteract this, we introduced smaller constant step sizes for TL adaptation. This now means that a sensor may have to produce an anomalous behavior multiple times in order to fully correct its TL.

The amount to increase or decrease the TL within the MRA can be fixed (constant) or variable, dependent on some signal or environmental condition such as the SNR of a signal. For TL tuning, we explore three different kinds of adjustment: 1) constant step down we call a decay rate, 2) step down based on a determination of a missed detection, and 3) step up based on a determination of a false detection. All of these values can be different, but for simplicity, let them all be the same user-specified step size, m. The approach used for the results in this paper determines a modification to the step size (increase or decrease in TL) modified as a function of how far from a nominal value the current TL is. Equation 2 employs a hyperbolic tangent function to scale the step size m, where $\eta$ is a nominal TL value ($m=0.03$ and $\eta=3$ for the purposes of this paper, found via trial and error) (see Table 1). The result of scaling the MRA step size to recover faster from extreme TL values.

TABLE 1

The result of scaling the MRA step size to recover faster from extreme TL values.

| MRA Decision | Current Trigger Level | Step Size Adjustment |
|---|---|---|
| Step Up | Higher than nominal | Decrease |
| Step Up | Lower than nominal | Increase |
| Step Down | Higher than nominal | Increase |
| Step Down | Lower than nominal | Decrease |

The value of $\eta$ should be chosen as a best guess average TL over a long duration, but not too small and not too large.

$$\text{step} = m \times \tan h(TL-\eta)) \qquad (2$$

As seen, an increase in TL occurs only when a sensor in the minority group detects a signal. A decrease in TL can occur when either a sensor in the minority group does not detect a signal or when a sensor is in the majority group. These three conditions are explained below with exact values used in experiments.

1. Increase the TL by 0.9 (1–step) when a sensor makes a false detection (i.e., detects a signal when the majority of its neighbors do not).
2. Decrease the TL by a fixed amount of 0.1*m when a sensor does not detect a signal that the majority of its neighbors did (i.e., a missed detection).
3. Decrease the TL by 0.05*(1+step) when a sensor makes a valid detection (i.e., detects a signal in agreement with a majority of its neighbors).

The differing factors of 0.9 and 0.05 exist because Condition 1 occurs rarely and must increase the TL enough to compensate for the Condition 3 TL decrease that occurs when no sensor detects a signal, a very common occurrence. Condition 2 invokes a larger decrease in TL intended to avoid missed detections. Since the MRA is a consensus-based approach to parameter tuning, valid detections reported by the DDT algorithm are those in the majority group only. Detections in the minority group are considered false and can be eliminated or labelled differently and stored along with valid detections in case evidence appears later in the processing pipeline for further consideration.

Figure 4:
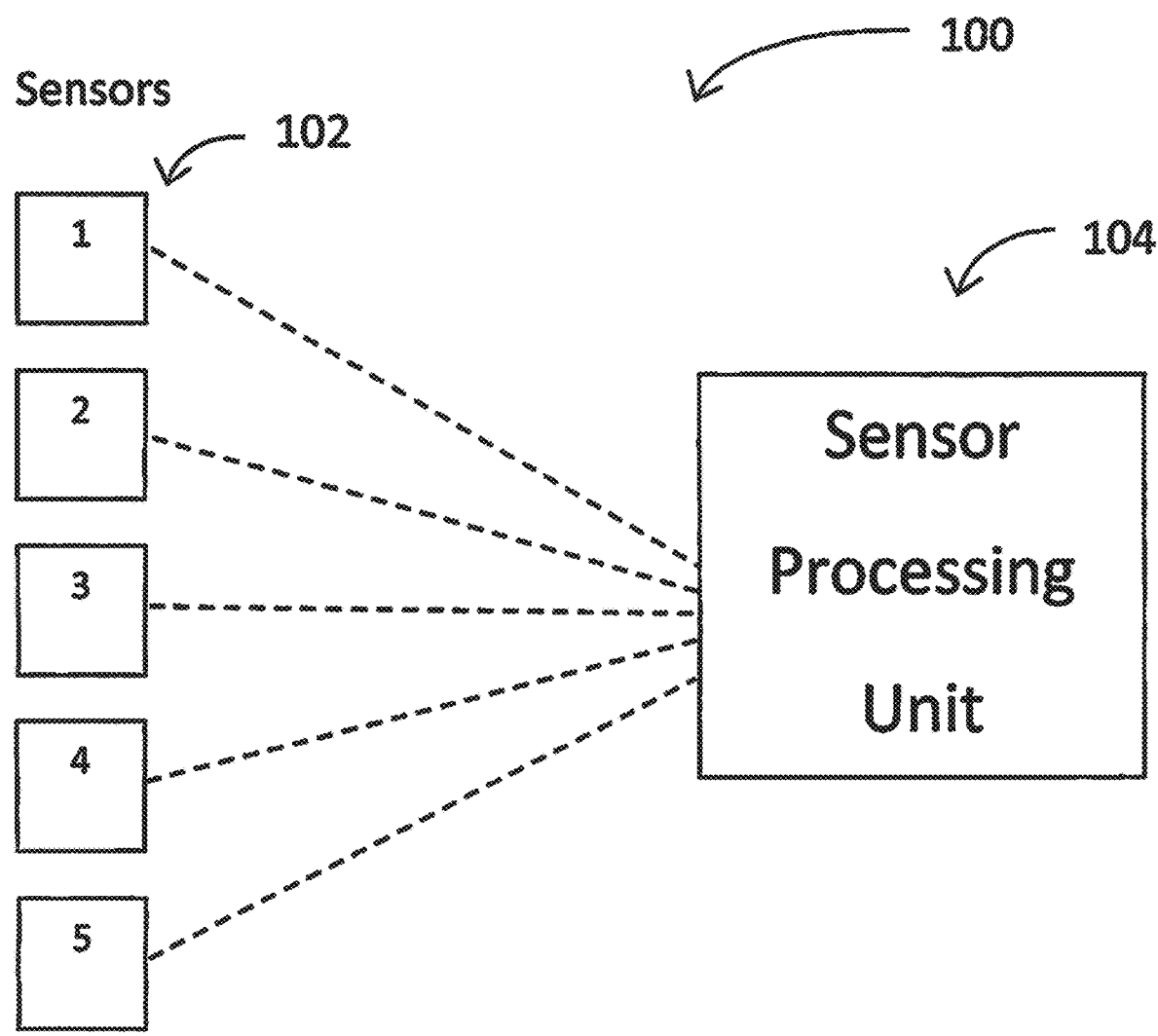
FIG. 4 illustrates a detection system according to an embodiment of the disclosure.

FIG. 4 illustrates a detection system 100 according to an embodiment of the disclosure. The system 100 includes a plurality of sensors 102 and a sensor processing unit 104. In this exemplary embodiment, the plurality of sensors 102 are seismic sensors, however, in other embodiments, the plurality of sensors 102 may be of any of the sensor types disclosed above. Also, in this exemplary embodiment, the number of sensors in the plurality of sensors is five, however, in other embodiments, the number of sensors may be three or more sensors. In another embodiment, the number of sensors may be five or more sensors. In an embodiment, the number of sensors may be a plurality of sensors.

The sensor processing unit 104 receives sensor signals transmitting sensor data, which will be referred to as "data," from the plurality of sensors 102. The sensor processing unit 104 receives sensor signals from the plurality of sensors and determines for each sensor if the corresponding received sensor signal meets or exceeds a predetermined trigger level, indicating the detection of an event. In an embodiment, the sensor processing unit 104 may record and/or report those signal detections to a user. In an embodiment, a detection may cause an alarm. The sensor processing unit 104 includes a processing architecture that tests the raw sensor signal against all detection-settings and automatically self-tunes the detector TL for each sensor to an emerging event across a plurality of sensors in real-time in accordance with the DDT architecture disclosed herein.

Figure 5:
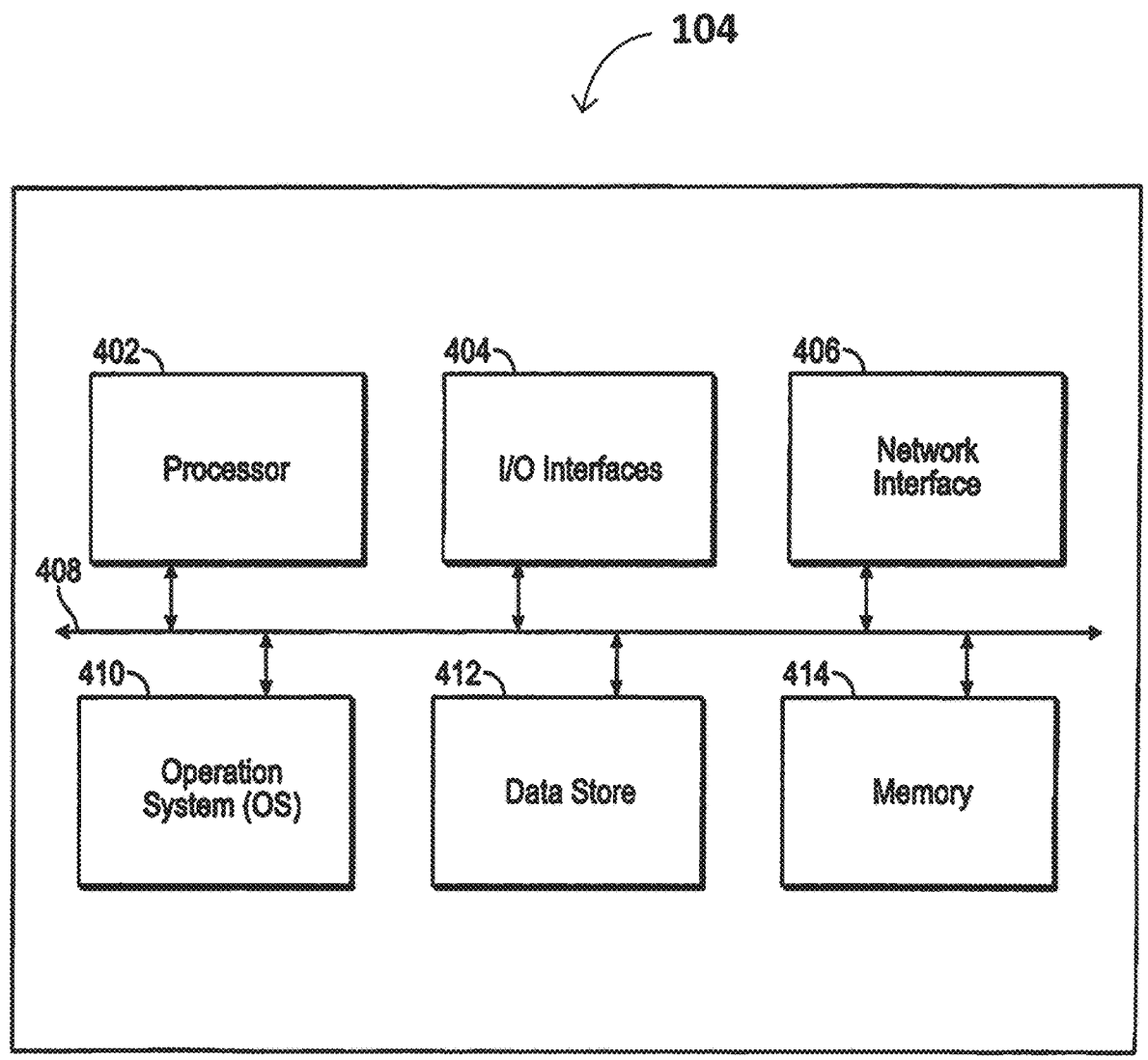
FIG. 5 illustrates a computer according to an embodiment of the disclosure.

Referring to FIG. 5, the sensor processing unit 104 includes processing equipment including a computer 400 for determining if an event has occurred and for adjusting trigger levels by the DDT architecture. The computer 400 can be a digital computer that, in terms of hardware architecture, generally includes s processor 402, input/output (I/O) interfaces 404, network interfaces 406, an operating system (O/S) 410, a data store 412, and a memory 414. The components (402, 404, 406, 410, 412, and 414) are communicatively coupled via a local interface 408. The local interface 408 can be, for example but not limited to, one or more buses or other wired or wireless connections, as is known in the art. The local interface 408 can have additional elements, which are omitted for simplicity, such as controllers, buffers (caches), drivers, among many others, to enable communications. Further, the local interface 408 can include address, control, and/or data connections to enable appropriate communications among the aforementioned components. The general operation of a computer comprising these elements is well known in the art.

The processor 402 is a hardware device for executing software instructions. The processor 402 can be any custom made or commercially available processor, a central processing unit (CPU), an auxiliary processor among several processors associated with the computer 400, a semiconductor-based microprocessor (in the form of a microchip or chip set), or generally any device for executing software instructions. When the computer 400 is in operation, the processor 402 is configured to execute software stored within the memory 414, to communicate data to and from the memory 414, and to generally control operations of the computer 400 pursuant to the software instructions.

The I/O interfaces 404 can be used to receive user input from and/or for providing system output to one or more devices or components. User input can be provided via, for example, a keyboard and/or a mouse. System output can be provided via a display device and a printer (not shown). I/O interfaces 404 can include, for example but not limited to, a serial port, a parallel port, a small computer system interface (SCSI), an infrared (IR) interface, a radio frequency (RF) interface, and/or a universal serial bus (USB) interface.

The network interfaces 406 can be used to enable the computer 400 to communicate on a network. For example, the computer 400 can utilize the network interfaces 408 to communicate via the internet to other computers or servers for software updates, technical support, etc. The network interfaces 408 can include, for example, an Ethernet card (e.g., 10BaseT. Fast Ethernet, Gigabit Ethernet) or a wireless local area network (WLAN) card (e.g., 802.11a/b/g). The network interfaces 408 can include address, control, and/or data connections to enable appropriate communications on the network.

A data store 412 can be used to store data. The data store 412 can include any of volatile non-transitory memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 412 can incorporate electronic, magnetic, optical, and/or other types of storage media. In one example, the data store 412 can be located internal to the computer 400 such as, for example, an internal hard drive connected to the local interface 408 in the computer 400. Additionally, in another embodiment, the data store can be located external to the computer 400 such as, for example, an external hard drive connected to the I/O interfaces 404 (e.g., SCSI or USB connection). Finally, in a third embodiment, the data store may be connected to the computer 400 through a network, such as, for example, a network attached file server.

The memory 414 can include any of volatile non-transitory memory elements (e.g., random access memory (RAM, such as DRAM, SRAM, SDRAM, etc.)), nonvolatile non-transitory memory elements (e.g., ROM, hard drive, tape, CDROM, etc.), and combinations thereof. Moreover, the memory 414 may incorporate non-transitory electronic, magnetic, optical, and/or other types of storage media. Note that the memory 414 can have a distributed architecture, where various components are situated remotely from one another, but can be accessed by the processor 402.

The software in memory 414 can include one or more software programs, each of which includes an ordered listing of executable instructions for implementing logical functions. The software in the memory system 414 includes the computer program product for performing the disclosed methods and a suitable operating system (O/S) 410. The operating system 410 essentially controls the execution of other computer programs, such as the interactive toolkit for sourcing valuation, and provides scheduling, input-output control, file and data management, memory management, and communication control and related services. The operating system 410 can be, but is not limited to any of Windows NT, Windows 2000, Windows XP, Windows Vista (all available from Microsoft, Corp. of Redmond, Wash.), Solaris (available from Sun Microsystems, Inc. of Palo Alto, Calif.), LINUX (or another UNIX variant) (available from Red Hat of Raleigh, N.C.), or other like operating system with similar functionality.

In an exemplary embodiment of the technology described herein, a computer 400 is configured to perform or execute the steps as depicted in flowcharts as described in the text and figures of this disclosure. According to an embodiment of the disclosure, a computer program product is configured to perform one or more of the executable programs for automatically self-tuning the signal detector for each sensor in real-time in accordance with the DDT architecture disclosed herein. The computer program product, located on computer 400, is configured specifically to perform these tasks. The computer program product is user-driven in a questionnaire style that coaches the user throughout the methodology. The interactive toolkit for performing the executable methods is configurable per user and application.

According to another embodiment of the invention, a computer program product is disclosed for performing the operations of the disclosed methods depicted in the flowchart as described in the text and drawings of this disclosure. In an embodiment, a computer program product is disclosed for performing the operations of the disclosed methods for automatically self-tuning the signal detector for each sensor in real-time in accordance with the DDT architecture disclosed herein In an embodiment, the computer program product is embedded within a non-transitory computer readable storage medium readable by a processor of a computer and configured to store instructions for execution by the processor.

Example. Seismic Event Detection

Figure 6:
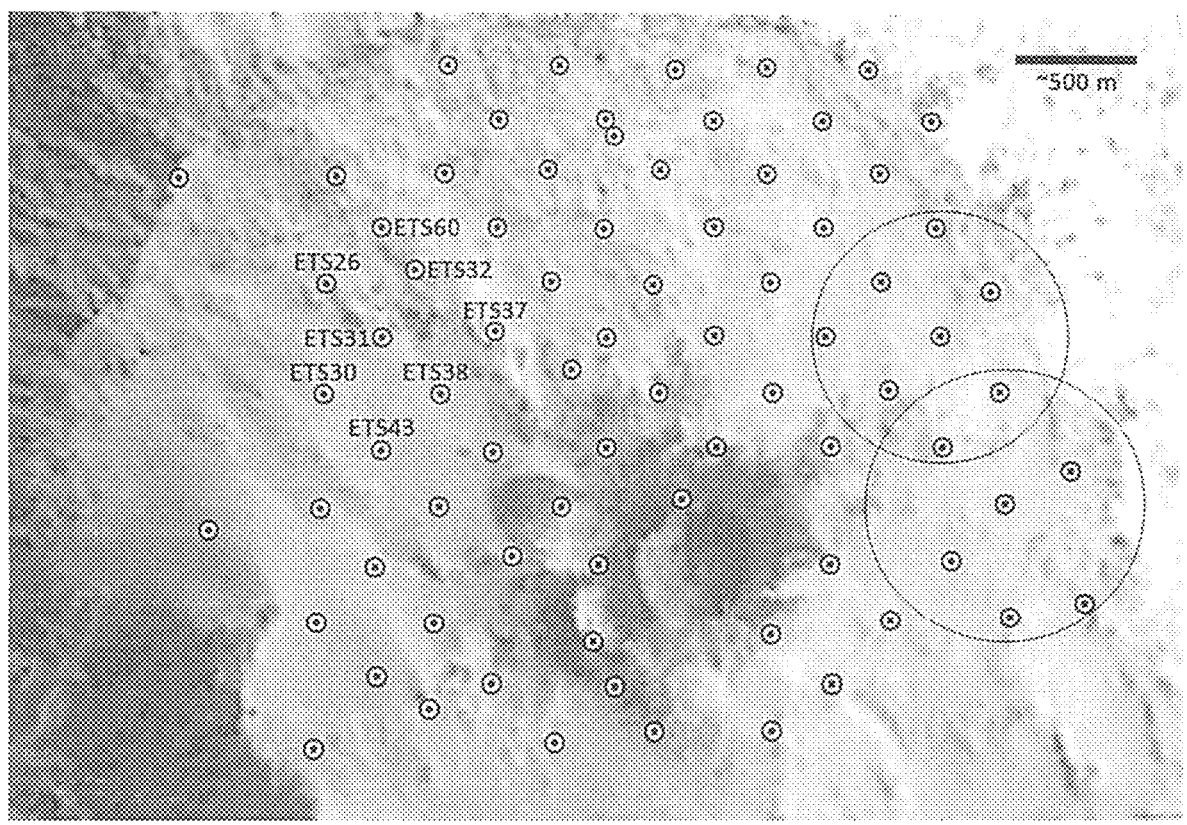
FIG. 6 shows the Erebus Volcano seismic network sensors on Mount Erebus Volcano in Antarctica, showing a neighborhood of 8 labelled sensors northwest of the volcano that are used in our experiments. Two other neighborhoods are illustrated for two sensors at the center of the large circles. The volcano itself is located at 77.56° south latitude and 167.17° east longitude.

The DDT algorithm was evaluated on waveform data from the Erebus Volcano seismic network, for which an event bulletin, including detections, exists. The detections in the bulletin were a result of using a STA/LTA signal detector with a rather high TL of 5, so an expert analyst was used to improve the bulletin for a subset of sensors through visual inspection of waveforms, adding missed detections related to events with three or more detections. Each sensor in a network will establish a neighborhood for itself with other sensors in close geographic proximity to one it (see FIG. 6). Enough sensors are required in a neighborhood to leverage agreement or disagreement of detections (generally between 5 and 10). The point is to have neighboring collaborators to aid the dynamic tuning of a single sensor. In the case of our experiments and for ease of illustrating DDT, we evaluate eight sensors northwest of the volcano, where each sensor utilizes the other seven as neighbors.

Figure 7:
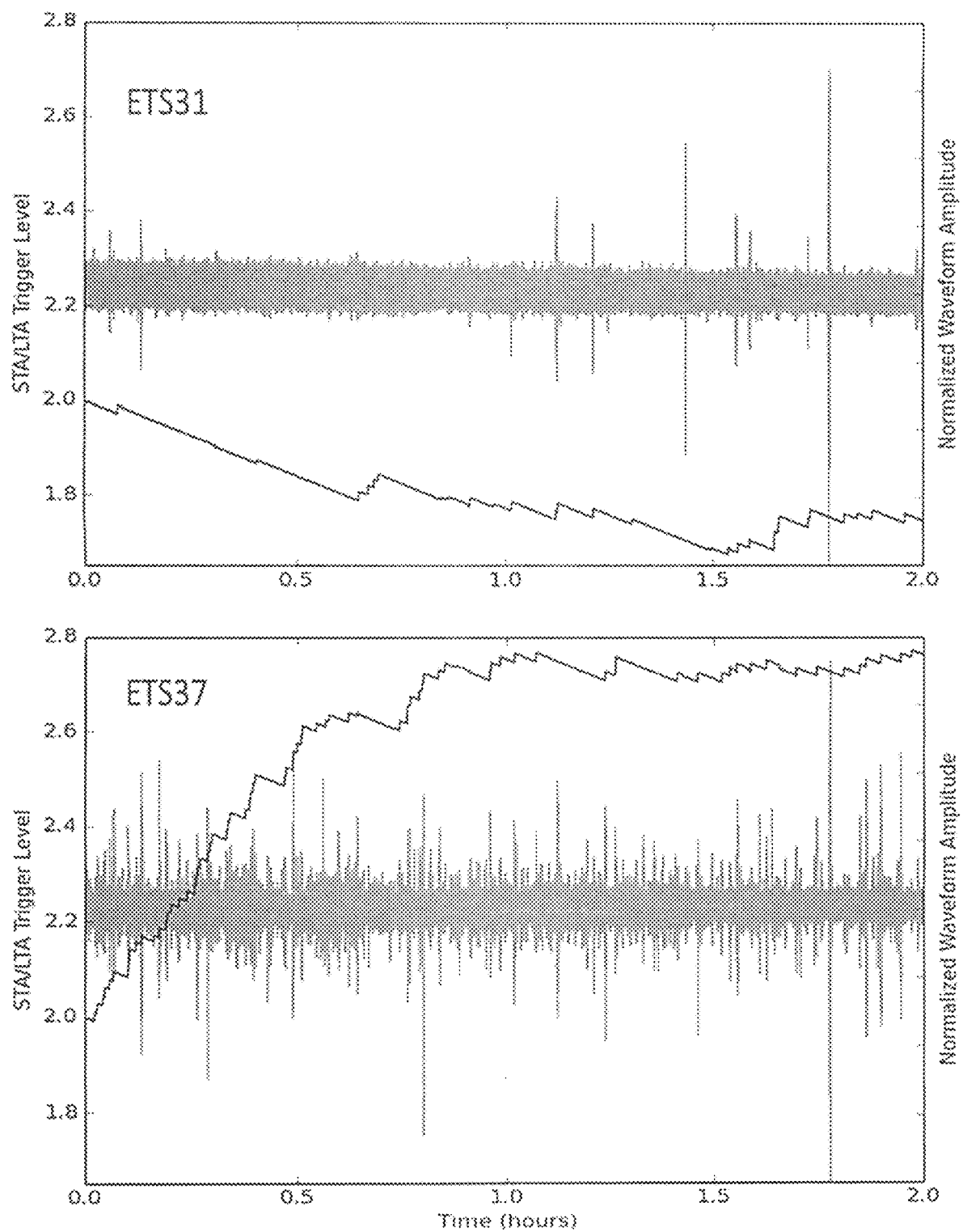
FIG. 7 shows trigger level variations as a result of underlying waveform characteristics. Time is relative to timestamp 1230163200.
Figure 8:
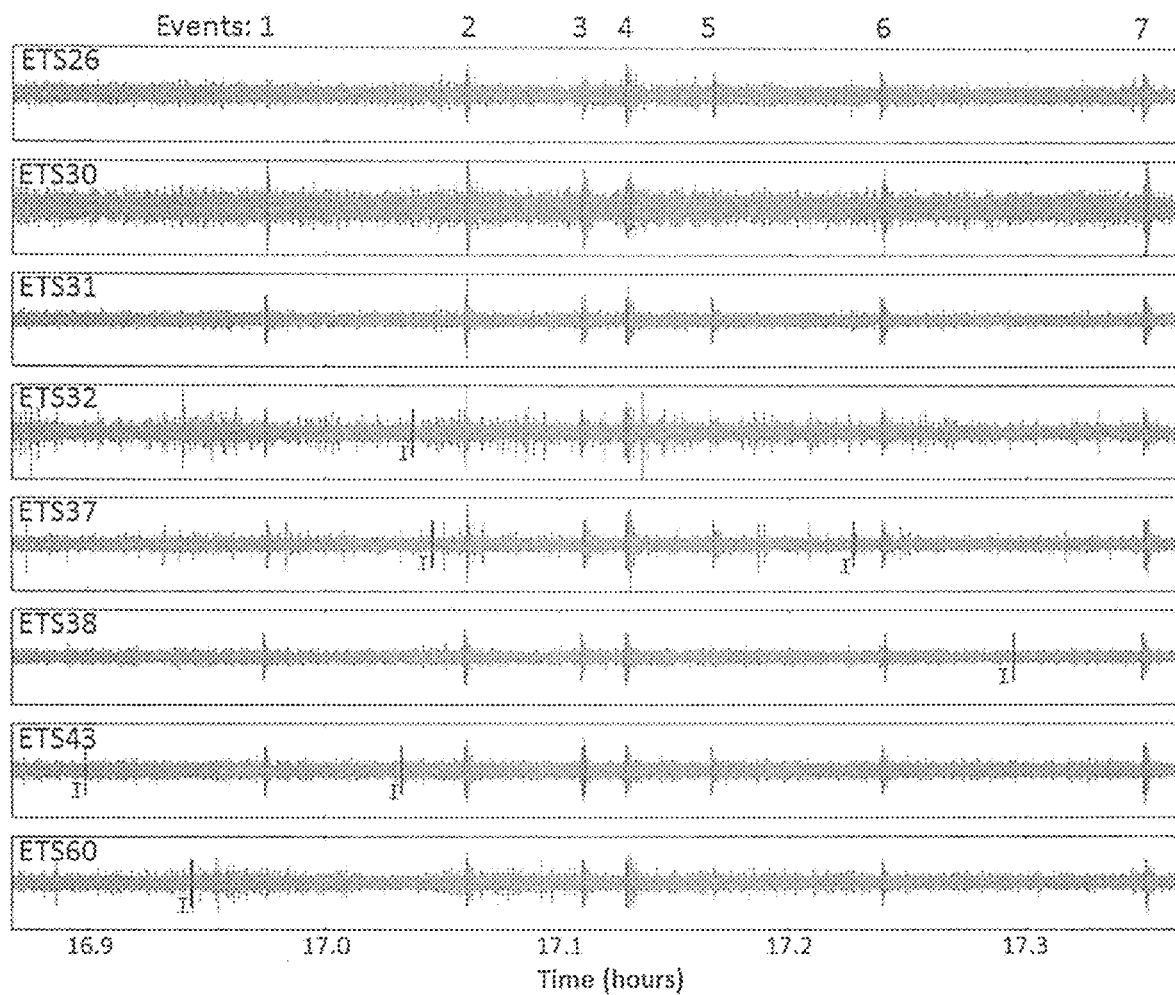
FIG. 8 shows signal detections (vertical markers) on Erebus waveforms using the Majority Rules Algorithm. Markers labelled with an I on the lower left indicate invalid detections in the minority group. Other markers indicate valid detections in the majority group. Time is relative to timestamp 1230163200.

The Erebus catalog contains a diverse set of natural and man-made sources that changes over time. The dataset shows both diurnal (e.g., ice freezing and thawing based on solar irradiance) and seasonal (extreme solar irradiance differences throughout the year) patterns in seismicity. Like many data sets from other polar region and remote counterparts, it contains a variety of data glitches and dropouts. Testing an algorithm in these conditions provides a true proving ground for its applicability and usability in real world scenarios. Time series from Dec. 25, 2008, are plotted in FIG. 7 (2 sensors for 2 hours), FIG. 8 (8 sensors for 30 minutes), and in FIG. 9 (1 sensor for 24 hours), illustrating the background noise and signal activity variations between sensors and over time.

DDT at Work

Figure 10:
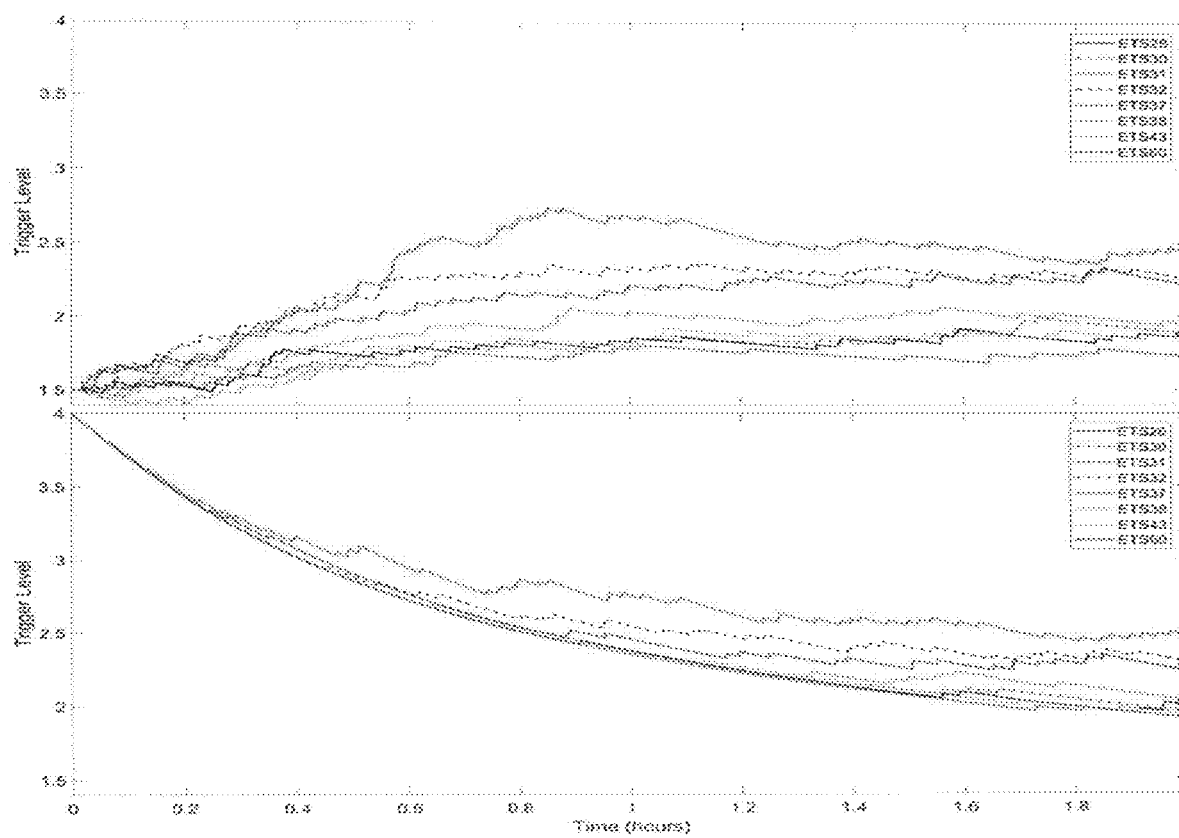
FIG. 10 shows trigger level values for each sensor during Dynamic Detector Tuning. Top: All TLs 478 levels start at 1.5. Bottom: All TLs start at 4.0. Note the similar per-sensor values resulting after two hours of tuning. Time is relative to timestamp 1230163200.

The expectation of applying the DDT algorithm to tune the signal detectors in a seismic network is that each sensor's parameter values will be unique, customized to its background noise level, and continuously adaptive. To illustrate how Equation 2 impacts TL step size adjustments in the MRA, we perform two hours of DDT at the beginning of the test period. Each sensor in a neighborhood of the Erebus network stabilizes to a unique STA/LTA detector TL value regardless of its initial setting and the rate of change is greater when the TLs are farther from the nominal value (see FIG. 10). Within two hours of waveform processing, TLs stabilize to some near-constant level, which then exhibits only minor deviations, reflecting changes in environmental conditions, where TLs change due to underlying waveform activity (see FIG. 7). Erebus sensor ETS37 experiences much more localized seismic activity, resulting in many false (anomalous) detections relative to its neighbors (sensor ETS31 in this case). Recall that a sensor's TL will decrease unless it records an anomalous (minority) signal detection. The only time a TL can increase is when it is part of a detecting minority group. MRA drives the ETS37 TL up with high frequency until its number of false detections stabilizes (i.e., it is in more agreement with its neighbors). ETS31 has relatively few false detections, allowing its TL to stay much lower.

Detection Ground Truth

To evaluate quantitatively how the self-tuning algorithm performs, a ground truth data set of "true" signal detections was created. The definition of a true signal detection is a detection that can be attributed to an event that is observed on at least 3 sensors by a human analyst. Thus, isolated signal detections that cannot be attributed to an event seen by at least 3 sensors are considered false, regardless of how they look. Using these criteria, a human analyst picked all the true signal detections on the 8 sensors in our Erebus sub-network for the 24-hour period of time on Dec. 25, 2008. The resulting set of signal detections for each sensor provide the ground truth arrival data on which to compare our automated signal detection results.

Experiment Results

DDT is tested against ground truth signal detections from Dec. 25, 2008 in the 8-sensor Erebus network neighborhood. In 30 minutes of waveforms, sufficient signals from seven visually evident events are detected by DDT to allow event location, even though signals from Events 1, 2, 3, and 5 are not detected by all sensors (see FIG. 8). The blue markers denote detections identified as invalid due to lack of consensus with the neighborhood and can be eliminated or included in a detection database with special notation. Even though all sensors did not have a detection from all events, there were no false detections to hamper event processing further down the pipeline. In this case, false detections are those that have majority consensus with neighbors but are not in the ground truth set.

Figure 11:
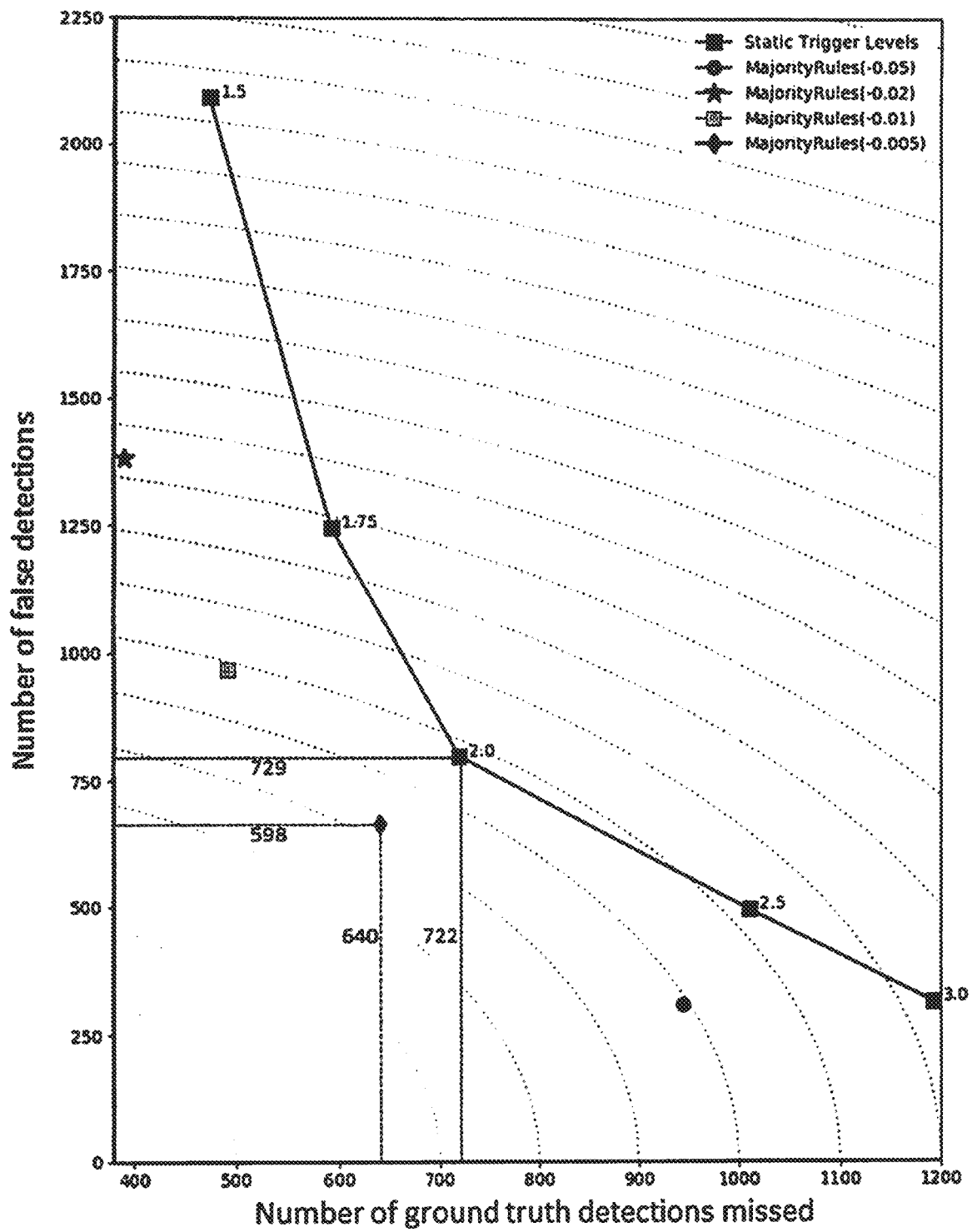
FIG. 11 is comparison of static TL performance and DDT Majority Rules TL performance based on false versus missed detections over a 22-hour scoring period. Contours of equal distance from the origin are shown as dotted curves.

We then evaluated DDT on 24 hours of Erebus data from the 8-sensor neighborhood and compared results against an STA/LTA detector with the same set of static TLs for all sensors throughout the test period (e.g. TL=2 for each sensor for the entire 24-hour period). The statistical metrics used to evaluate detection quality are the number of missed detections and the number of false detections relative to our human analyst ground truth. An effective way to compare detection methods using these metrics is a False vs. Missed detections plot (see FIG. 11), where better scores are closer to the origin (zero missed and zero false detections). The data was processed under two different STA/LTA detector conditions: 1) five different static TLs and 2) DDT at four different MRA decay rates and initial TLs starting at the same five different values as the static case. Although the detector processed the entire 24 hours, only the last 22 hours were used to evaluate the performance of the detectors, allowing the DDT algorithm to stabilize. The detections acquired during each processing experiment were compared against the ground truth set of signal detections to determine the total number of missed and false detections during the 22-hour evaluation period. The arrival time of an automatic detection must be within 5 seconds of the arrival time of a ground truth detection for the automated detection to be considered valid. The impact of varying a static TL is evident in that decreasing the TL leads to fewer missed and more false detections and increasing the TL leads to more missed and fewer false detections. The appropriate ratio of missed to false detections is for a user to decide and often depends on the application (e.g., nuclear non-proliferation monitoring where missing an event of interest is not acceptable vs. Erebus icequake detection where missing a few events is insignificant). The set of static TL tests define a typical false event/missed event tradeoff curve with the best compromise achieved for a static TL of 2.0. The set of DDT results for different decay rates also forms a typical tradeoff curve, but clearly shifted toward better results for both criteria, and with the best compromise achieved for a decay rate of −0.005. For the optimal parameters (static threshold of 2.0 vs. DDT decay rate of −0.005), DDT processing results in 82 fewer missed and 131 fewer false detections (see FIG. 11). In addition, all of the DDT detectors for one decay rate (with different initial TL values) converge to the same point on the plot. This is a valuable attribute since it is often difficult to identify what TL to use for a network of sensors.

Figure 9:
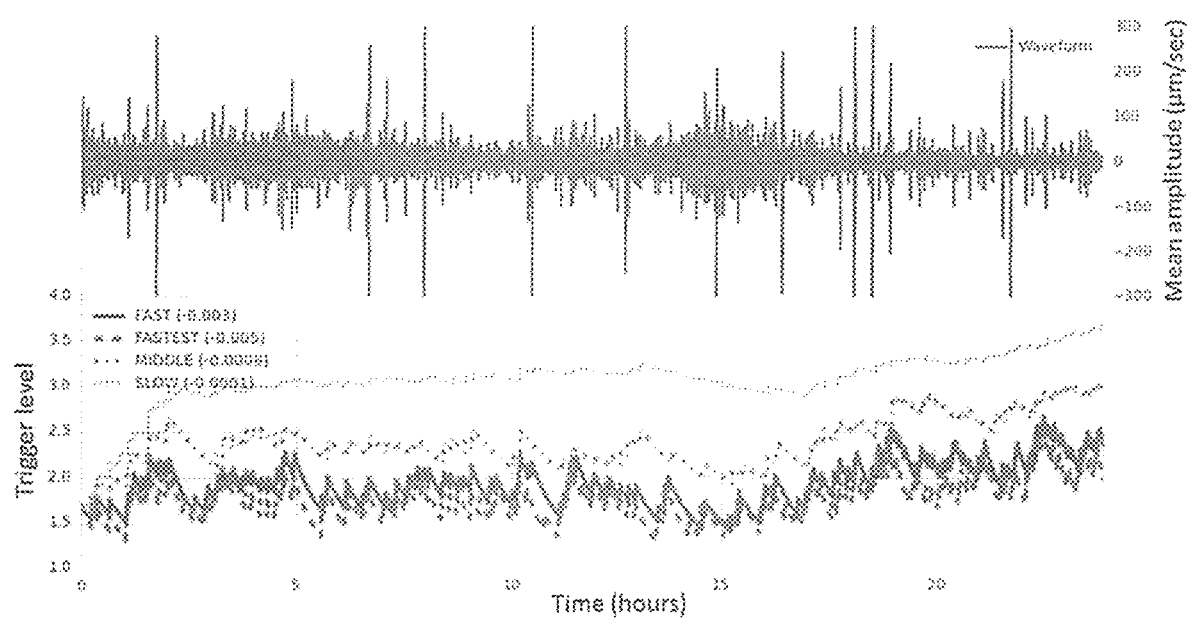
FIG. 9 shows DDT TL variations at different decay rates (in parentheses in legend). Time is relative to timestamp 1230163200.

TLs adapt to changing conditions in the underlying seismic waveform regardless of the decay 270 rate magnitude, although larger magnitudes drive TLs relatively lower (see FIG. 9). The seismogram from ETS37 over a 24-hour period shows different background noise levels and event activity throughout the day. A user can choose a decay rate that results in higher and lower relative TLs (fewer false detections versus fewer missed detections). At approximately hour 13 in FIG. 9, the background energy clearly increases, which will cause a reduction in the Signal to Noise ratio. DDT lowers the trigger level for ETS37 in order to detect these lower SNR signals and raises it after the SNR increases around hour 17.

If environmental conditions never changed, an optimal static TL on each sensor might provide good performance, but because the environmental conditions do change on variable time-scales, adapting to these changing conditions should enhance detection ability. Optimal TL values are a function of the SNR of signals recorded from events of interest and the number of extraneous invalid signal activity. If background noise decreases for a particular sensor, the SNR will increase for a given event signal and the TL can correspondingly increase to detect the signal. At the same time, if a sensor is experiencing a large number of extraneous signal activity not related to events of interest, detections will be considered false and DDT will increase the TL to avoid detecting these invalid signals.

Figure 12:
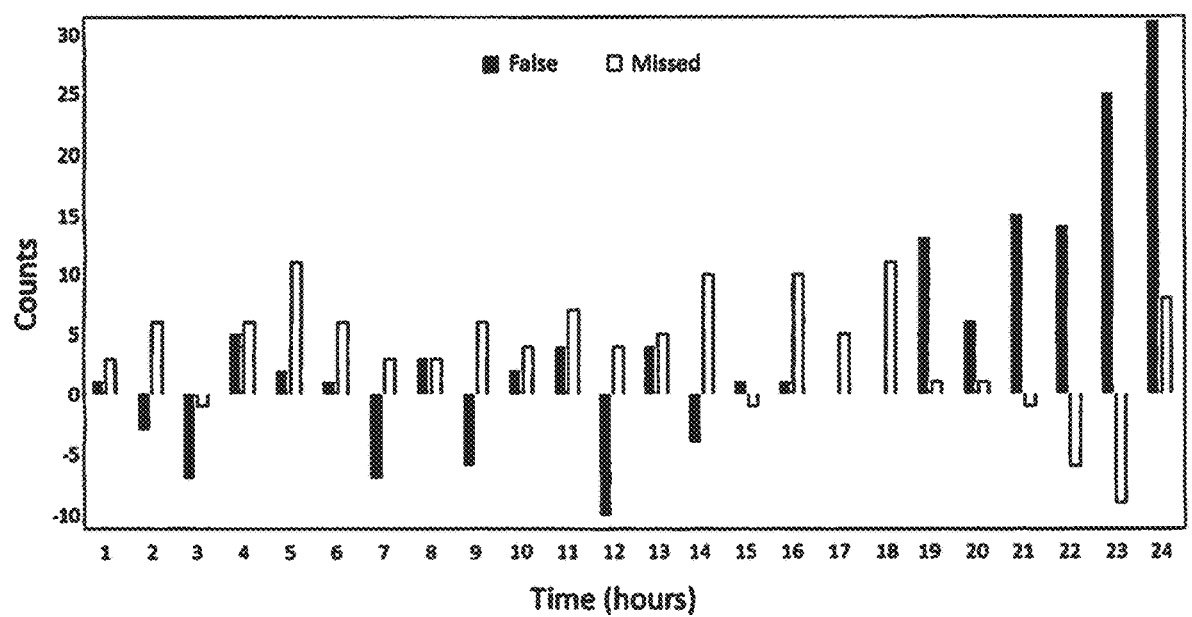
FIG. 12 is a comparison of seismic signal detections over time between STA/LTA with a static TL of 2 and DDT TLs with a decay rate of −0.003. Counts are the false and missed detections from static TLs minus the false and missed detections from DDT. Positive numbers indicate the number of fewer false and missed detections from DDT compared to static TLs.

We evaluate the performance of static and DDT signal detections over time. with false and missed detections indicated every two hours during a 24-hour period (see FIG. 12). DDT results in fewer missed detections (positive numbers in FIG. 12) during much of the day. Missed detections are generally worse than false detections so long as the number of false detections isn't extreme. At approximately 15 hours into the day, there is an approximately 3-hour long high-amplitude transient seismic event, possibly related to volcanic activity, followed immediately by a decrease in background noise level and many high-amplitude seismic events. The detection environment during the latter part of the day becomes more challenging, leading to more DDT missed signal detections relative to static TLs. However, the number of DDT false signal detections stays is considerably lower in comparison to static TLs. In this particular case, our analysis showed that the missed signal detections from DDT during the end of the day did not affect the ability to detect events, which is of utmost importance, because each event still had 3 or more sensor detections.

In Summary, DDT involves two primary techniques to improve signal detection.
1. Tuning of detection parameters with the Majority Rules Algorithm (see FIG. 3). The Majority Rules Algorithm is the reinforcement element of FIG. 2, adapting detection parameter values to the current state of the environment.
2. Event-based filtering of detections to identify whether an individual detection is valid or not. Agreement with neighboring sensors is required for a detection to be valid. The number of agreeing sensors is a user-specified number.

The invention being thus described, it will be obvious that the same may be varied in many ways. Such variations are not to be regarded as a departure from the spirit and scope of the invention, and all such modifications, as would be obvious to one skilled in the art, are intended to be included within the scope of the appended claims. It is intended that the scope of the invention be defined by the claims appended hereto. The entire disclosures of all references, applications, patents and publications cited above are hereby incorporated by reference.

In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. A detection system, comprising:
three or more sensors that each generate sensor data;
a processing unit for receiving the sensor data; and
a processor configured to test the sensor data against all event-settings and automatically self-tune a signal detector for each sensor of the three or more sensors.

2. The system of claim 1 wherein the processor executes a majority rules algorithm to determine the threshold level of detection for each sensor.

3. The system of claim 2, wherein the majority rules algorithm compares signal detections to adjust a trigger level of one or more of the three or more sensors.

4. The system of claim 1, wherein the processor executes a decay rate algorithm to continuously lower each sensor's detector trigger level unless the majority rules algorithm adjusts it differently.

5. The system of claim 3, wherein the majority rules algorithm compares a sensor signal initiating a detection within a specified time window to signal detections of neighboring sensors within a same time window and if the sensor signal is in the minority of detection decisions by either detecting a signal when most of its neighbors did not or by not detecting a signal when most of its neighbors did, then the system adjusts the sensor trigger level.

6. The system of claim 5, wherein if a sensor's detection decision is in the minority of its neighborhood, its trigger level will be increased if it detected a signal in the specified time window and its trigger level will be decrease if it did not detect a signal in the specified time window.

7. The system of claim 1, wherein the one or more sensors are seismic sensor.

8. A method for determining a threshold detection level for an event of a signal, comprising:
receiving a signal from three or more sensors;
determining if each signal exceeds a threshold detection level indicating an event; and
comparing a sensor signal initiating a detection within a specified time window to signal detections of neighboring sensors within a same time window and if the sensor signal is in the minority of detection decisions by either detecting a signal when most of its neighbors did not or by not detecting a signal when most of its neighbors did, then adjusting the sensor trigger level.

9. The method of claim 8 wherein the processor executes a majority rules algorithm to determine the threshold level of detection for each sensor is determined by a majority rules algorithm.

10. The method of claim 9, wherein the majority rules algorithm compares signal detections to adjust a trigger level of one or more of the three or more sensors.

11. The method of claim 8, wherein processor executes a decay rate algorithm to continuously lower each sensor's detector trigger level unless the majority rules algorithm adjusts it differently.

12. The method of claim 8, wherein if a sensor's detection decision is in the minority of its neighborhood, its trigger level will be increased if it detected a signal in the specified time window and its trigger level will be decrease if it did not detect a signal in the specified time window.

13. The method of claim 8, wherein the three or more sensors are seismic sensor.

14. A computer program product, comprising:
a non-transitory computer recordable storage medium storing computer code which, when executed by a processor, performs a computer-implemented method of determining a threshold detection level for an event of a signal, comprising:
receiving a signal from three or more sensors;
determining if each signal exceeds a threshold detection level indicating an event; and
comparing a sensor signal initiating a detection within a specified time window to signal detections of neighboring sensors within a same time window and if the sensor signal is in the minority of detection decisions by either detecting a signal when most of its neighbors did not or by not detecting a signal when most of its neighbors did, then adjusting the sensor trigger level.

15. The computer program product of claim 14, wherein the processor executes a majority rules algorithm to determine the threshold level of detection for each sensor is determined by a majority rules algorithm.

16. The computer program product of claim 15, wherein the majority rules algorithm compares signal detections to adjust a trigger level of one or more of the three or more sensors.

17. The computer program product of claim 14, wherein processor executes a decay rate algorithm to continuously lower each sensor's detector trigger level unless the majority rules algorithm adjusts it differently.

18. The computer program product of claim 14, wherein if a sensor's detection decision is in the minority of its neighborhood, its trigger level will be increased if it detected a signal in the specified time window and its trigger level will be decrease if it did not detect a signal in the specified time window.

* * * * *